United States Patent [19]

Tarasen

[11] 4,256,868

[45] Mar. 17, 1981

[54] EPOXY RESINS CONTAINING CHEMICALLY BONDED METAL ATOMS

[75] Inventor: William L. Tarasen, Lakewood, Calif.

[73] Assignee: Hitco, Irving, Calif.

[21] Appl. No.: 102,639

[22] Filed: Dec. 12, 1979

[51] Int. Cl.³ .................. C08G 59/02; C08G 59/14; C08G 59/30

[52] U.S. Cl. .................. 528/9; 260/326.5 A; 528/96; 528/117; 528/341

[58] Field of Search .................. 528/9, 96, 117, 341, 528/395; 260/326.5 A

[56] References Cited

U.S. PATENT DOCUMENTS

| | | | |
|---|---|---|---|
| 4,087,482 | 5/1978 | Shaffer | 526/241 X |
| 4,185,043 | 1/1980 | Shaffer | 525/364 |

*Primary Examiner*—Earl A. Nielsen
*Attorney, Agent, or Firm*—Roylance, Abrams, Berdo & Farley

[57] ABSTRACT

There is disclosed the reaction product of an epoxy resin and a metal complex which is a reaction product of tungsten carbonyl and/or molybdenum carbonyl with pyrrolidine.

4 Claims, No Drawings

EPOXY RESINS CONTAINING CHEMICALLY BONDED METAL ATOMS

BACKGROUND OF THE INVENTION

1. Field of the Invention

This invention relates to thermosetting polymers which incorporate metal atoms. More particularly, this invention relates to the reaction product of an epoxy resin and a metal complex which is a reaction product of tungsten carbonyl and/or molybdenum carbonyl with pyrrolidine.

2. Description of the Prior Art

U.S. Pat. No. 4,087,482 to Robert C. Shaffer, discloses furfuryl alcohol copolymers of a polyester prepolymer of maleic acid or anhydride and a polyhydric alcohol which incorporate tungsten and/or molybdenum metal atoms. The metal atoms are incorporated into the copolymers by reacting the polyester prepolymer with a reaction product of tungsten or molybdenum and pyrrolidine.

U.S. Application Ser. No. 893,622, filed Apr. 5, 1978, issued Jan. 22, 1980 as U.S. Pat. No. 4,185,043, discloses thermoplastic and thermosetting polymers which incorporate tungsten and/or molybdenum metal atoms. The metal atoms are incorporated into the polymer by reacting a monomer or polymer containing at least one free carboxyl group with a reaction product of tungsten or molybdenum and pyrrolidine.

BRIEF SUMMARY OF THE INVENTION

It has been discovered that the properties of epoxy resins may be improved by incorporating therein at least one metal selected from the group consisting of tungsten and molybdenum. Thus, in accordance with the present invention, tungsten and/or molybdenum metal atoms are incorporated into the polymer chain of an epoxy resin. Preferably, the epoxy resin contains at least two functional epoxy groups per molecule of resin. The presence of the metal atoms in the basic resin molecule makes possible the formulation of resin matrix systems which are capable of absorbing large amounts of energy for specific related applications. Depending on the specific formulation employed, these metal containing epoxy resins are useful for the fabrication of composites, castings, reimpregnation resins, foam resins and other uses usually found for synthetic resin systems.

DESCRIPTION OF THE PREFERRED EMBODIMENTS

In order to prepare the metal containing polymers of this invention, a complex is first prepared by reacting tungsten carbonyl or molybdenum carbonyl, with pyrrolidine. The reaction between the metal carbonyl and pyrrolidine may be accomplished in one of several methods found in the literature, e.g., an article by Fowles et al entitled "The Reactions of Group VI Metal Carbonyls with Pyrrolidine, Piperazine and Morpholine", Inorganic Chemistry, Vol. 3, No. 2, February 1964, pages 257–259. The reaction product consisting of the pyrrolidine-metal carbonyl complex is ground to a fine powder for subsequent reaction.

The reaction product consisting of the pyrrolidine-metal carbonyl complex is believed to contain at least two moles of pyrrolidine to one mole of carbonyl. It is reactive with epoxy groups.

The epoxy resins which are suitable for use in this invention are well known in the art. An example is the diglycidyl ether of Bisphenol A, normally formed as a condensation product of epichlorohydrin and Bisphenol A (i.e., bis(4-hydroxyphenyl)dimethylmethane). Condensation products of epichlorohydrin with other polyhydric alcohols may also be used such as the diglycidyl ether of Bisphenol F (i.e., 4,4'-dihydroxybiphenyl). Other suitable epoxy resins include epoxidized glycerin dialiphatic esters, 1,4'-bis(2,3-epoxy-propoxy)benzene; 1,3-bis(2,3-epoxy-propoxy)benzene; 4,4'-bis(2,3-epoxy-propoxy)diphenyl ether; 1,8-bis(2,3-epoxy-propoxy)octane; 1,4'-bis(2,3-epoxy-propoxy)cyclohexane; 4,4-bis(2-hydroxy-3,4'-epoxy-butoxy)-2-chlorocyclohexane; 1,3-bis(2-hydroxy-3,4-epoxy-butoxybenzene) and 1,4-bis(2-hydroxy-4,5-epoxy-pentoxy)benzene.

The epoxy resin is reacted with the pyrrolidine-metal carbonyl reaction product by combining the two materials and heating the reaction mixture, preferably within the range of from about 30°–100° C. The amount of pyrrolidine-metal carbonyl reaction product which is reacted with the epoxy resin may vary widely. Preferably from about 0.1 to 1 mole of pyrrolidine-metal carbonyl reaction product is reacted per mole of epoxy resin. The metallic component of the resin is an integral part of the molecular structure of the resin and is therefore of atomic or near atomic size.

The metal containing epoxy resins of this invention are useful in a wide variety of applications, e.g., in the fabrication of composites, castings, as reimpregnation and/or laminating resins, foamed resins and other uses usually found for resin systems. They may be used in carbonaceous form. The presence of the metal atom in the basic epoxy resin molecule makes possible the formation of epoxy resin matrix systems which are capable of absorbing large amounts of energy for specific related applications.

A foamed resin may be formed in situ by the rapid heating of the metal containing epoxy resin, resulting in the formation of CO gas. An unfoamed resin may be made by using lower cure temperatures for a longer period of time. At lower cure temperatures, it may be advantageous to utilize a hardening agent such as an amine hardener to speed the cure.

The following example illustrates the best mode contemplated for carrying out this invention:

EXAMPLE

One mole equivalent of tungsten hexacarbonyl and an excess of pyrrolidine are reacted to form the metal pyrrolidine complex. At the completion of the reaction, the product is washed and ground to a fine powder.

One mole of the metal carbonyl pyrrolidine reaction product is reacted with two moles of an epoxy resin obtained by the reaction of epichlorohydrin and Bisphenol A. Reaction is accomplished by heating the metal carbonyl pyrrolidine reaction product and the epoxy resin at a temperature of from 80° to 100° C. for a period of 5 to 10 minutes. The reaction product is then allowed to cool.

The thermosetting metal containing epoxy resins of this invention may be cured under a variety of conditions. Thus, the resin may be heated from 50° to 150° C. to cure the resin or it may be admixed with an amine hardener, e.g., from 5 to 25% by weight of methanediamine and the mixture heated until cured. Epoxy hardening agents are well known in the art and any such agent which is normally used to cross link a Bisphenol A-epichlorohydrin resin, such as a polyfunctional amine, a polyfunctional amine adduct, a blocked amine, e.g., ketimine or a polyamine may be used. The specific curing times and temperatures will depend upon the desired physical state of the resin and the particular use or treatment of the product. The metal containing epoxy resin of this invention would be useful, for example, in the foamed state as an insulation type of coating in fuel tank applications or as an insulating filler for honeycomb construction.

What is claimed is:

1. The reaction product of an epoxy resin and a metal complex which is a reaction product of tungsten carbonyl and/or molybdenum carbonyl with pyrrolidine.

2. A product as defined in claim 1 wherein said epoxy resin is the reaction product of epichlorohydrin and Bisphenol A.

3. The thermoset reaction product obtained by heating the product of claim 1.

4. The thermoset reaction product obtained by admixing the product of claim 1 with an epoxy resin curing agent.

* * * * *